(12) United States Patent
Zerfas et al.

(10) Patent No.: US 10,708,668 B2
(45) Date of Patent: Jul. 7, 2020

(54) METHODS AND SYSTEMS FOR REMOTELY MONITORING CONNECTIVITY AND NETWORK PERFORMANCE IN HOSPITALITY ENVIRONMENTS

(71) Applicant: SONIFI Solutions, Inc., Sioux Falls, SD (US)

(72) Inventors: Matthew Christopher Zerfas, Sioux Falls, SD (US); Joel Walter Zdepski, Mountain View, CA (US); Christopher Paul Wollmann, Sioux Falls, SD (US); Shaun Eugene Marko, Oak Park, IL (US); Derin Michael Zerr, Kahului, HI (US)

(73) Assignee: SONIFI SOLUTIONS, INC., Sioux Falls, SD (US)

( * ) Notice: Subject to any disclaimer, the term of this patent is extended or adjusted under 35 U.S.C. 154(b) by 13 days.

(21) Appl. No.: 15/913,702

(22) Filed: Mar. 6, 2018

(65) Prior Publication Data

US 2018/0255369 A1  Sep. 6, 2018

Related U.S. Application Data

(60) Provisional application No. 62/467,676, filed on Mar. 6, 2017.

(51) Int. Cl.
| | |
|---|---|
| *H04N 21/658* | (2011.01) |
| *H04N 21/442* | (2011.01) |
| *H04N 21/214* | (2011.01) |
| *H04N 21/24* | (2011.01) |

(52) U.S. Cl.
CPC ....... *H04N 21/658* (2013.01); *H04N 21/2143* (2013.01); *H04N 21/2402* (2013.01); *H04N 21/4424* (2013.01); *H04N 21/44227* (2013.01)

(58) Field of Classification Search
CPC .............. H04L 29/08072; H04L 29/06; H04L 29/0809; H04L 29/06047; H04L 41/00; G06Q 30/02
See application file for complete search history.

(56) References Cited

U.S. PATENT DOCUMENTS

| | | | |
|---|---|---|---|
| 8,843,622 B1* | 9/2014 | Graham | .................. G06F 15/16 |
| 9,571,826 B1 | 2/2017 | Azralon et al. | |
| 2012/0185441 A1* | 7/2012 | Sankar | ..................... G06F 17/30 |
| 2013/0151893 A1 | 6/2013 | Gorecha et al. | |

(Continued)

OTHER PUBLICATIONS

International Search Report and Written Opinion for International (PCT) Patent Application No. PCT/US18/21170, dated May 14, 2018 9 pages.

*Primary Examiner* — Anthony Bantamoi
(74) *Attorney, Agent, or Firm* — Sheridan Ross P.C.

(57) ABSTRACT

Systems and methods for obtaining network diagnostic information within a hospitality environment are provided. More specifically, application identification information may be received at a diagnostic device, based on the application identification information, a diagnostic application may be received, site configuration may be obtained, the diagnostic application may be configured with the site configuration information, and network diagnostic information may be obtained. The network diagnostic information may then be provided to a remote monitoring server.

20 Claims, 10 Drawing Sheets

(56) References Cited

U.S. PATENT DOCUMENTS

2014/0250470 A1* 9/2014 Warrick ........... H04N 21/42206
2015/0140986 A1* 5/2015 Lamb .................... H04W 8/205
2016/0099849 A1   4/2016 Batla et al.
2018/0131751 A1* 5/2018 Jones ...................... H04L 67/10

* cited by examiner

| Device_Name | Site_Name | IP_Address | Subnet | Physical_Location | Diagnostic_Information | Other |
|---|---|---|---|---|---|---|
| DEV_1 | Site_1 | 2001:db8:85a3:8a2e:370:7334 | /64 | Floor_2_RM_5 | X, Y, Z | Other |
| DEV_A | Site_1 | 2001:db8:85a3:8a2e:370:7374 | /64 | Floor_2_RM_4 | A, B, X, Z | Other |
| DEV_& | Site_2 | 2002:db8:85a3:8a2e:370:7334 | /32 | Conference_1 | B, D, Z | Other |
| DEV_& | Site_2 | 2002:db8:85a3:8a2e:370:7234 | /32 | SRVC_CL_1 | A, D, Z | Other |

METHODS AND SYSTEMS FOR REMOTELY MONITORING CONNECTIVITY AND NETWORK PERFORMANCE IN HOSPITALITY ENVIRONMENTS

CROSS-REFERENCE TO RELATED APPLICATIONS

This application claims the benefit of U.S. Provisional Patent Application Ser. No. 62/467,676, filed Mar. 6, 2017, the entire disclosure of which is hereby incorporated herein by reference for all that it teaches and for all purposes.

FIELD

Systems and methods directed to diagnostic displaying of customized content and further executing a series of applications on output devices are disclosed.

BACKGROUND

Increasingly, video entertainment, such as movies and television shows, is delivered to users on demand over digital networks. In addition, the distribution of content has expanded to include user devices, such as smart phones. These user devices have the ability to interface with content delivery systems and to output video and other content to users and various output devices. However, because of the need for mobility, the output capabilities of user devices are necessarily limited. Therefore, it is desirable to direct content streams associated with a user device to televisions or home theater systems.

Systems and methods currently available include those that involve establishing a dedicated connection between a user device and an output device. In many hospitality settings, there is a desire to provide entertainment services to guests using applications and devices that are familiar to guests. Accordingly, making such entertainment services, such as Netflix® for example, available to the guest has proved to be difficult while maintaining security and implementing device isolation, which prevents user devices from discovering other devices. Moreover, bandwidth requirements associated with entertainment services and content increase the need for a stable network infrastructure. Changes or variances in a network can cause a successfully implemented guest provisioned content streaming solution to become unstable or worse, unusable. Accordingly, new diagnostic capability implemented in hospitality establishments is needed.

SUMMARY

Embodiments of the present disclosure are directed to systems and methods for obtaining a clearer picture of a status of a hospitality environment, such as a hotel. In some embodiments, a plurality of distributed diagnostic applications, or apps, capable of being executed on previously provisioned and/or previously installed components of a guest provisioned content streaming solution are provided. Such apps, together with various reporting tools, may provide, in near real-time, test results for a given hospitality site relating to measurements and metrics of network performance at various locations in and about the hospitality site. Further, the app may run on specific media output devices, such as existing hospitality Chromecast devices, that are constantly on. This will allow a headless media output device to send information back to a monitoring server located in the cloud for example. This monitoring server will maintain a dashboard of information provided by the local player and/or media output device's monitoring app running on the Chromecast device.

In accordance with embodiments of the present disclosure, a new type of device registered in/to a system network controller (SNC) is needed. Rather than a standard media output device or approved test device, such standalone device would be a diagnostic device having a different configuration than that of the standard media output device. However, such diagnostic device may run the same or different hardware and/or software to implement the monitoring process. A new diagnostic app may launch from the same external server as the standard welcome app, but be designed entirely for diagnostics. Moreover, a monitoring server residing in the cloud may be utilized to accept and display diagnostics from the diagnostic app running on a Chromecast device located in a hospitality environment.

In accordance with embodiments of the present disclosure, local player devices meant for diagnostic purposes will be configured and named prior to being sent to a site. For example, a particular naming convention would inform the SNC that when this device comes online and registers itself, it is not a guest room device but is in another location, such as an equipment room or housekeeping closet. Accordingly, installation crews choose 1 to n number of diagnostic locations on property during an install. These locations preferably are located relative to guest rooms for accurate representation of the guest network. Non-limiting examples of locations to install such devices include maid closets, equipment closets, or other locations with an available AC power connection. When connected to power, the diagnostic local player will join the standard hospitality network and will be seen by the SNC. Accordingly, the SNC recognizes the local player as a diagnostic configuration due to its naming convention and the SNC registers it as a permanent diagnostic device. The SNC will tell the diagnostic device to launch the diagnostic app rather than the standard welcome app. Accordingly, the diagnostic app will launch and retrieve its site configuration. Once the diagnostic app obtains the site configuration information, the diagnostic app will reach out to the monitoring server with a web call containing its information. Information may include, but is not limited to, site, name, address, permanent/transient, and other available information. If the diagnostic device is not already registered, the monitoring server will register the diagnostic device. Thus, the monitoring server will now expect communication with the registered diagnostic device on a regular basis. For example, the registered device will make a call to the monitoring server every fifteen minutes providing as much diagnostic information as possible. Additional monitoring may include a lack of communication from the diagnostic app. For example, if a communication from a given diagnostic device is not received within an expected timeframe, the monitoring server may add such device to a warning dashboard. If the monitoring server does not see the expected communications within a certain time frame, the diagnostic device will be added to a failures dashboard and an issue may be raised for further investigation. For example, an email notification may be sent to one or more individuals responsible for maintaining a site infrastructure.

In accordance with embodiments of the present disclosure, each local player diagnostic device should be registered as either permanent or transient within the SNC. A default setting may be permanent if the local player device is to remain on location, but setting it to transient would allow a field service tech or hotel engineer to plug it into any output device, such as a TV, as a localized test. Moreover, the diagnostic app should visually display status information including its name, IP address, communication status with the monitoring server, etc. if plugged into an output device, such as a TV. Further, a subset of the diagnostic functionality could be put into the standard guest room welcome app, but monitoring information, such as expected communication, would have to be treated differently since such device may not have guaranteed power sources.

In accordance with embodiments of the present disclosure, a monitoring server dashboard would maintain history such that the monitoring history may be queried for repeated failure patterns and to verify service level agreements. The monitoring server might be its own entity or perhaps part of another entity. Accordingly, data collected by the monitoring server may feed PropX or Splunk. Moreover, the monitoring server may include site isolated accounts so that the monitoring server is usable by third parties and other resellers. Further, the SNC may also report the status to the monitoring server so there is one location to check a site's status and get failure notifications.

In accordance with embodiments of the present disclosure, when the diagnostic device is set to a "walkabout" mode, the diagnostic device could operate as a transient device but would provide more frequent information, such as more frequent pings, to instantly verify pathways, connections, and delays. Thus, an installer may get live reporting from the monitoring server on the location of poor communication.

In accordance with embodiments of the present disclosure, a method for obtaining network diagnostic information within a hospitality environment is provided. The method may include receiving application identification information at a diagnostic device, retrieving a diagnostic application based on the application identification information, obtaining site configuration information, configuring the diagnostic application with the site configuration information, obtaining network diagnostic information, and providing the network diagnostic information to a remote monitoring server.

Aspects of the above embodiment may include where the diagnostic device is a local player device communicatively coupled to an output device. Further aspects of the above embodiment may include executing, at startup, a default application at the local player device, determining a status of the local player device, and retrieving the diagnostic application based on the determined status. Additional aspects of the above embodiment may include where the status of the local player device is based on the local player device being inactive for a specified period of time. Another aspect of the above embodiment may include determining whether the diagnostic device has communicated with the remote monitoring server within a specified period of time, and providing a communication to an entity if the diagnostic device has not communicated with the remote monitoring server within the specified period of time. Additional aspects of the above embodiment include where a frequency at which the diagnostic device provides the network diagnostic information to the remote server is based on the site configuration information. Another aspect of the above embodiment may include providing a status of the diagnostic device to a requesting device, and receiving the diagnostic application based on the determined status.

In accordance with embodiments of the present disclosure, a communication system is provided. The communication system may include a first server, a remote monitoring server, a local player, wherein the local player is in communication with the first server, and an output device, where the local player provides a status message to the first server, the local player receives application identification information from the first server, the application identification information identifying a diagnostic application to launch, the local player retrieves site configuration information, the local player obtains network diagnostic information, and the local player provides the network diagnostic information to the remote monitoring server.

Aspects of the above embodiment may include where the local player executes a default application at startup, and wherein the local player receives the application identification information from the first server based on the status message. Additional aspects of the above embodiment may include where the status message indicates an amount of time that the local player has been inactive. An additional aspect of the above embodiment may include where the first server requests a status from the local player, and wherein the status indicates an amount of time that the local player has been inactive. An additional aspect of the above embodiment may include where the remote monitoring server determines whether the local player has communicated with the remote monitoring server within a specified period of time, and if the local player has not communicated with the remote monitoring server with the specified period of time, the remote monitoring server provides a notification to a receiving entity. Further still, an additional aspect of the above embodiment may include where a frequency at which the local player provides the network diagnostic information to the remote monitoring server is based on the site configuration information.

In accordance with embodiments of the present disclosure, a computer-readable device comprising executable instructions is provided. When the executable instructions are executed by one or more processors, the one or more processors receive application identification information at a diagnostic device, retrieve a diagnostic application based on the application identification information, obtain site configuration information, configure the diagnostic application with the site configuration information, obtain network diagnostic information, and provide the network diagnostic information to a remote monitoring server.

Additional aspects of the above embodiment include where the diagnostic device is a local player device communicatively coupled to an output device. Further aspects include where the executable instructions cause the one or more processors to execute, at startup, a default application at the local player device, determine a status of the local player device, and retrieve the diagnostic application based on the determined status. Further still, aspects of the above embodiment include where the status of the local player device is based on the local player device being inactive for a specified period of time. Additional aspects of the above embodiment include where the executable instructions cause the one or more processors to determine whether the diagnostic device has communicated with the remote monitoring server within a specified period of time, and provide a communication to an entity if the diagnostic device has not communicated with the remote monitoring server within the specified period of time. Further aspects of the above embodiment include where a frequency at which the diagnostic device provides the network diagnostic information to the remote server is based on the site configuration information. Additional aspects of the above embodiment include where the executable instructions cause the one or more processors to provide a status of the diagnostic device to a requesting device, and receive the diagnostic application based on the determined status.

Additional features and advantages of embodiments of the present disclosure will become more readily apparent from the following description, particularly when taken together with the accompanying drawings.

BRIEF DESCRIPTION OF THE DRAWINGS

Exemplary embodiments of the present disclosure are described in conjunction with the appended figures wherein.

DETAILED DESCRIPTION

Figure 1:
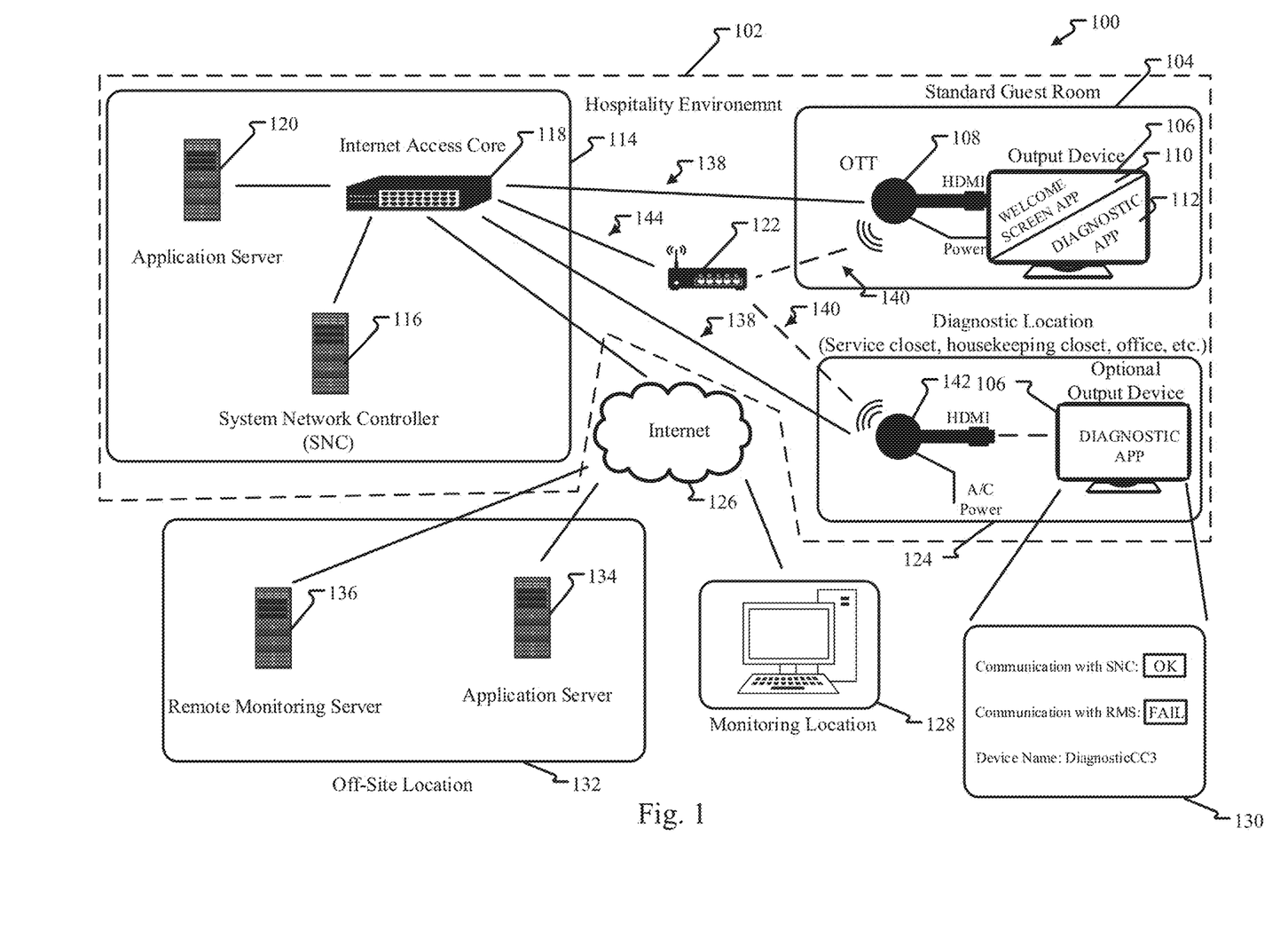
FIG. 1 is a block diagram depicting components of a system in accordance with embodiments of the present disclosure.

FIG. 1 is a block diagram illustrating a system 100 for enabling and monitoring connectivity in accordance with embodiments of the present disclosure. The system 100 is generally configured to operate in one or more hospitality environments 102, such as a guest room 104. The system 100 generally includes one or more output devices 106; the output device 106 may be one or more of a television, monitor, or similar output device. The output device 106 may be in communication with a local player 108, such as a Chromecast device or other device capable of supporting one or more multimedia streaming sessions. The local player 108 may also be referred to as an over-the-top device. The local player 108 may be connected to the output device 106 via an HDMI port. Power may be supplied to the local player 108 through a USB port associated with the output device 106. The USB port may be one that supplies power when the output device 106 is itself powered on or can be configured to supply power continuously. In accordance with other embodiments, power may be supplied to the local player 108 through other means. For example, the local player 108 can be connected to a wall outlet providing power. Alternatively, or in addition, the local player 108 may reside within the output device 106. That is, the output device 106 may include the functionality of the local player 108. In accordance with embodiments of the present disclosure, the local player 108 may receive content, such as multimedia content, to be rendered or otherwise output to the output device 106 at the direction of a system network controller 116 as part of a local premises or hotel headend system 114.

The local player 108 and/or the output device 106 may be connected to the system network controller (SNC) 116 through a communication network segment 138 and/or via a wireless access point 122 together with a communication network segment 140 and communication network segment 144. The SNC 116 may perform registration functions with respect to local players 108, output devices 106, and other devices capable of providing content, such as multimedia content, to the output device 106. More particularly, the SNC 116 may maintain a table of information associating the local player 108 to the guest room 104.

In accordance with embodiments of the present disclosure, the system 100 may include various other devices and network nodes, located locally or remotely with respect to the output devices 108. For example, the local premises or hotel headend system 114 may include the SNC 116 and a local area network switch, router, and/or Internet access core 118, which may be associated with a wireless or wireline (e.g., Ethernet) network or networks. As a further example, an application server 120 can be provided as part of the local premises or hotel headend system 114; the application server 120 may host or otherwise make applications accessible to the local player 108. The local premises or hotel headend system 114 may generally include a control center in an entertainment system where various signals are brought together and monitored before being introduced into the local entertainment network. The reference to local premises or hotel headend system 114 is not limited to video entertainment providers, such as cable tv systems, but may also include various monitoring and control features associated with Internet access, wireless Internet access, output devices 106, local players 108, and other devices and services a guest of a hospitality establishment may use. Various other devices may be connected to the local premises or hotel headend system 114 via the Internet 126. Examples of such systems include, but are not limited to, an application server 134 accessible by the local player 108 and a remote monitoring server 136.

An application at the local player 108 can be launched via a command from the SNC server 116 when the SNC server 116 detects that a local player 108 has powered up and/or is not in use. A local player app or application, such as a default app at power up, communicates with the local SNC server 116 to obtain information regarding a room in which the local player 108 is installed, such as the guest room 104, and site the local player 108 is installed, such as the hospitality environment 102. The information from the local SNC server 116 also contains the URL for an app, such as a second app, to launch. Once this information is retrieved, the currently executing app on the local player (the default app for instance) calls the specified URL and loads the requested application from a server. The URL for the requested application may point to the application server 120, the application server 134, the SNC 116 and/or another location having an accessible app, such as a receiver app, that runs on the local player 108.

In accordance with embodiments of the present disclosure, the local player 108 may execute one or more applications upon startup, such as, but not limited to, a default start-up app and/or a welcome screen app 110, and cause to be rendered to the output device 106, a welcome screen 110. In some instances, and if an output device 106 and/or local player 108 is not currently being utilized by a guest of diagnostic applications, or apps, the system network controller 116 and/or the local player 108 may cause the local player 108 to execute a diagnostic application, or diagnostic app 112. In some instances, the local player 108 may cause the output device 106 to display one or more diagnostic information displays associated with the running diagnostic app 112. When the local player 108 is executing the diagnostic app 112, the local player 108 may effectively be operating as a diagnostic device. For example, the diagnostic device 142 may comprise a local player 108 executing a diagnostic app 112.

Each of the local player 108 and/or diagnostic device 142 executing a diagnostic app 112 may provide diagnostic device configuration information to the system network controller 116 and/or remote monitoring server 136. Further, the diagnostic device 142 and/or local player 108 executing the diagnostic app 112 may provide device diagnostic information to the system network controller 116 and/or remote monitoring server 136 including one or more user devices, for example by performing a network scan and determining which users devices are connected to the network and/or network segment, such as a virtual local area network. Such information may include, but is not limited to, network scan information, throughput information, network device information, route configuration and utilization information, ping information, delay and jitter information, connection information, and/or other diagnostic information as needed. Moreover, and as previously mentioned, such information obtained by the local player 108 and/or diagnostic device 142 may be displayed to an output device 106 if connected. As one example, the output information may include information depicted by a diagnostic output display 130, where the diagnostic output display 130 may include connection information and/or configuration information. The system network controller 116 and/or the remote monitoring server 136 may obtain the diagnostic information provided by the local player 108 and/or diagnostic device 142, filter such information, and make such information available to a device at a monitoring location 130, such as a call center, network operations center, OEM, or other responsible for following up on one or more initial alerts provided by one or more diagnostic devices 142 and/or local players 108 executing a diagnostic app 112. The monitoring location 128 may be staffed by one or more individuals tasked with monitoring one or more hospitality environments 102.

Figure 2:
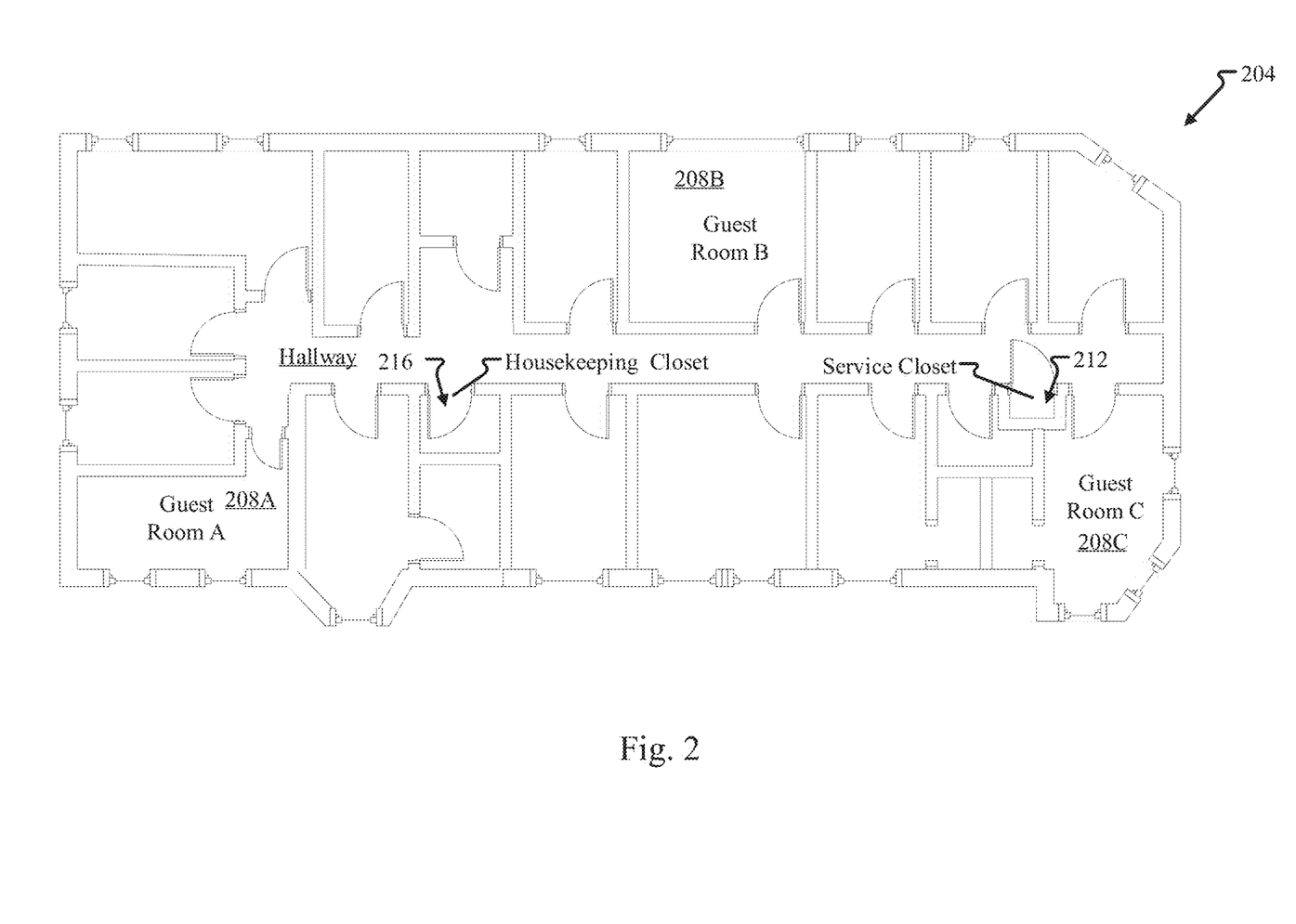
FIG. 2 depicts an example of one or more locations in an example hospitality setting.

FIG. 2 depicts an example of one or more hospitality floor plans 204 including locations in an example hospitality setting in accordance with embodiments of the present disclosure. That is, the hospitality floor plan 204 a hospitality environment 102, for example, is provided; a diagnostic device 142 and/or local player 108 executing a diagnostic app 112 may reside in the housekeeping closets 216, a service closet 212 or elsewhere and preferably would be located in close physical proximity to one or more guest rooms 208A-C for example. In that the system 100 may communicate using wireless communication protocols, such as 802.11 for example, multiple diagnostic devices 142 and/or 108 executing a diagnostic app 112 may be included in the system to monitor network parameters in various parts of the hospitality environment 102. Thus, local player 108 within a guest room 208A for example, may be executing a welcome screen and/or facilitating multimedia content delivery to the output device 106 while a diagnostic device 142 executing a diagnostic app 112 may be located in a housekeeping closet 216; the diagnostic device 142 located in the housekeeping closet 216 may obtain diagnostic information, including network conditions, while the local player 108 in the guest room 208A is delivering content to the output device 106. In accordance with embodiments of the present disclosure, if the local player 108 in the guest room 208A is no longer in use, the local player 108 may execute a diagnostic app 112 and provide network diagnostic information. As one example, both the diagnostic device 142 in the housekeeping closet 216 and the local player 108 executing a diagnostic app 112 in the guest room 208A may provide diagnostic information about the network and/or connectivity related information, while for example, a local player 108 is facilitating multimedia content delivery to an output device 106 in guest room 208B for example.

Figure 3:
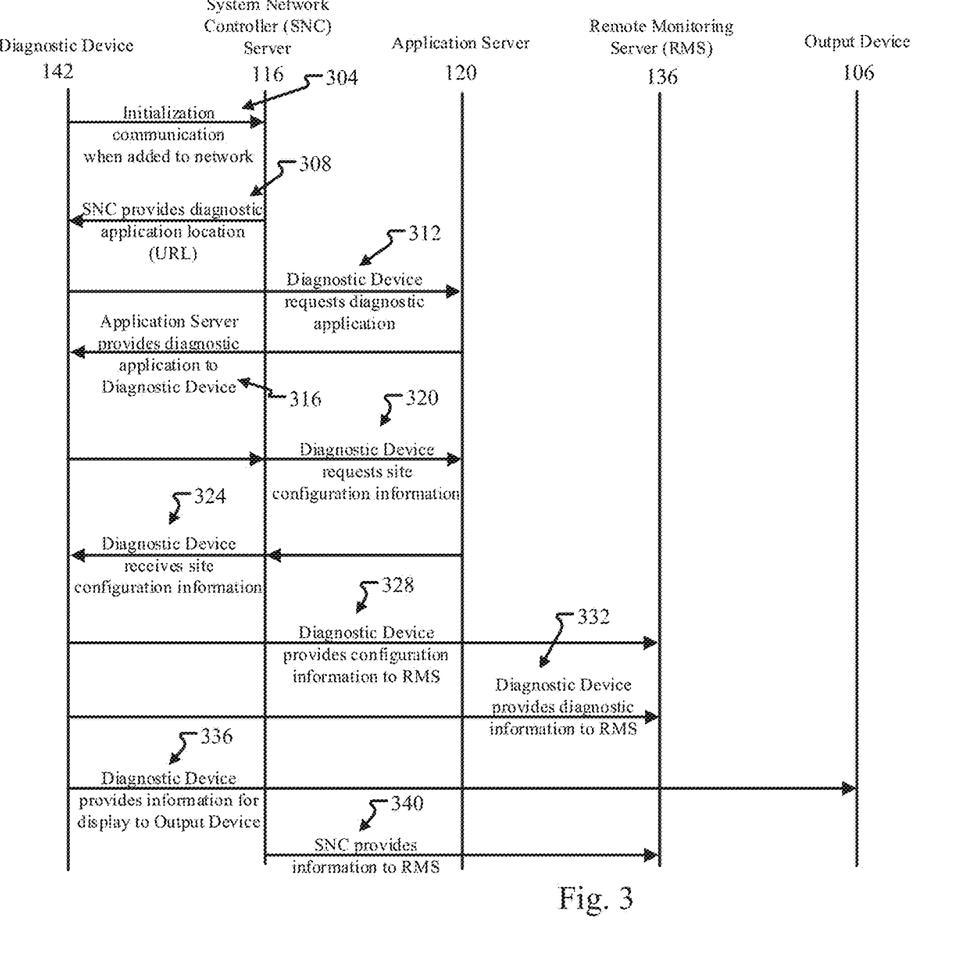
FIG. 3 depicts a first messaging diagram in accordance with embodiments of the present disclosure.

FIG. 3 depicts a first messaging diagram in accordance with embodiments of the present disclosure. When a diagnostic device 142 is added to the network within a hospitality environment 102, the diagnostic device 142 may initially communicate with the SNC 116 based on naming conventions, address conventions, and/or otherwise at step 304. The SNC 116 may provide the diagnostic device 142 a location of a diagnostic application 112, such as a URL at step 308; the diagnostic device 142 may then request the diagnostic application 112 from an application server 120/136 for example, at step 312. Alternatively, or in addition, the diagnostic application may be retrieved from the SNC 116 or other server. The diagnostic app 112 may be provided to the diagnostic device 142 at step 316. The diagnostic device 142 may also receive site-specific site configuration information at step 324 in response to requesting such information from the application server 120 and/or SNC 116 at step 320. Such information may be provided by the application server, SNC, or another location capable of providing such information and may include information such as, but not limited to, the name of the device, site location, update frequency, and whether such device is to be a permanent or temporary device. The diagnostic device 142 may then provide diagnostic device configuration information to a remote monitoring server 136 at step 328 for example. Further, the diagnostic device 142 may then provide diagnostic device diagnostic information to a remote monitoring server 136 including one or more user devices at step 332. Such information may include, but is not limited to, network scan information, throughput information, network device information, route configuration and utilization information, ping information, delay and jitter information, connection information, and/or other diagnostic information as needed. Moreover, such information may be displayed to an output device 106 if connected, at step 336. In accordance with embodiments of the present disclosure, the SNC 116 may also provide diagnostic information to the remote monitoring server 136 at step 340.

Figure 4:
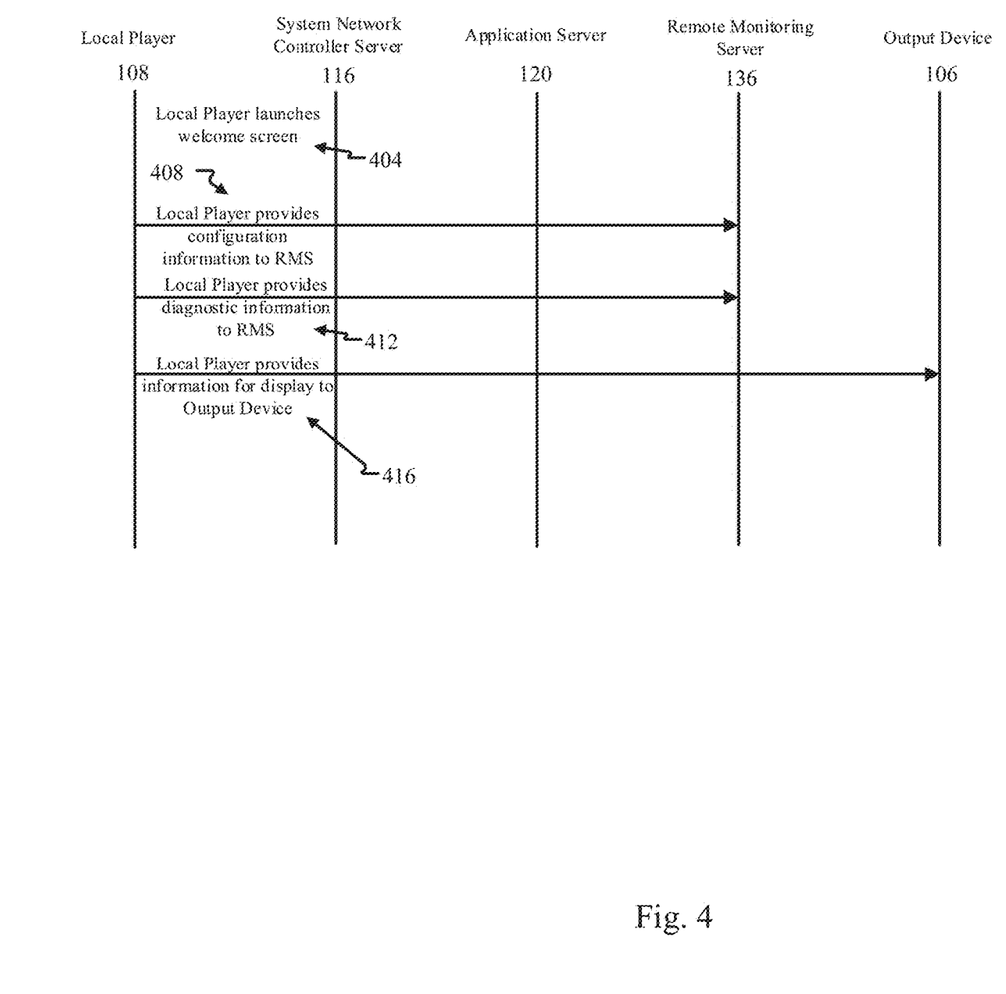
FIG. 4 depicts a second messaging diagram in accordance with embodiments of the present disclosure.

FIG. 4 depicts a messaging diagram for a local player/OTT device utilized in the system 100 in accordance with embodiments of the present disclosure. Initially, the local player 108 may launch a welcome app to display a welcome screen 110 and/or provide other default content to the output device 106 at step 404. The local player 108 may provide configuration information to the remote monitoring server 136 and/or SNC 116 while the welcome app is being executed at step 408. Further still, the local player 108 may provide diagnostic information to the remote monitoring server 136 and/or SNC 116 as the local player/OTT executes the welcome app and/or facilitates multimedia content delivery to the output device 106 at step 412. In accordance with embodiments of the present disclosure, the local player 108 may also provide such diagnostic information to the output device 106, such as a TV, as previously mentioned, at step 416.

Figure 5:
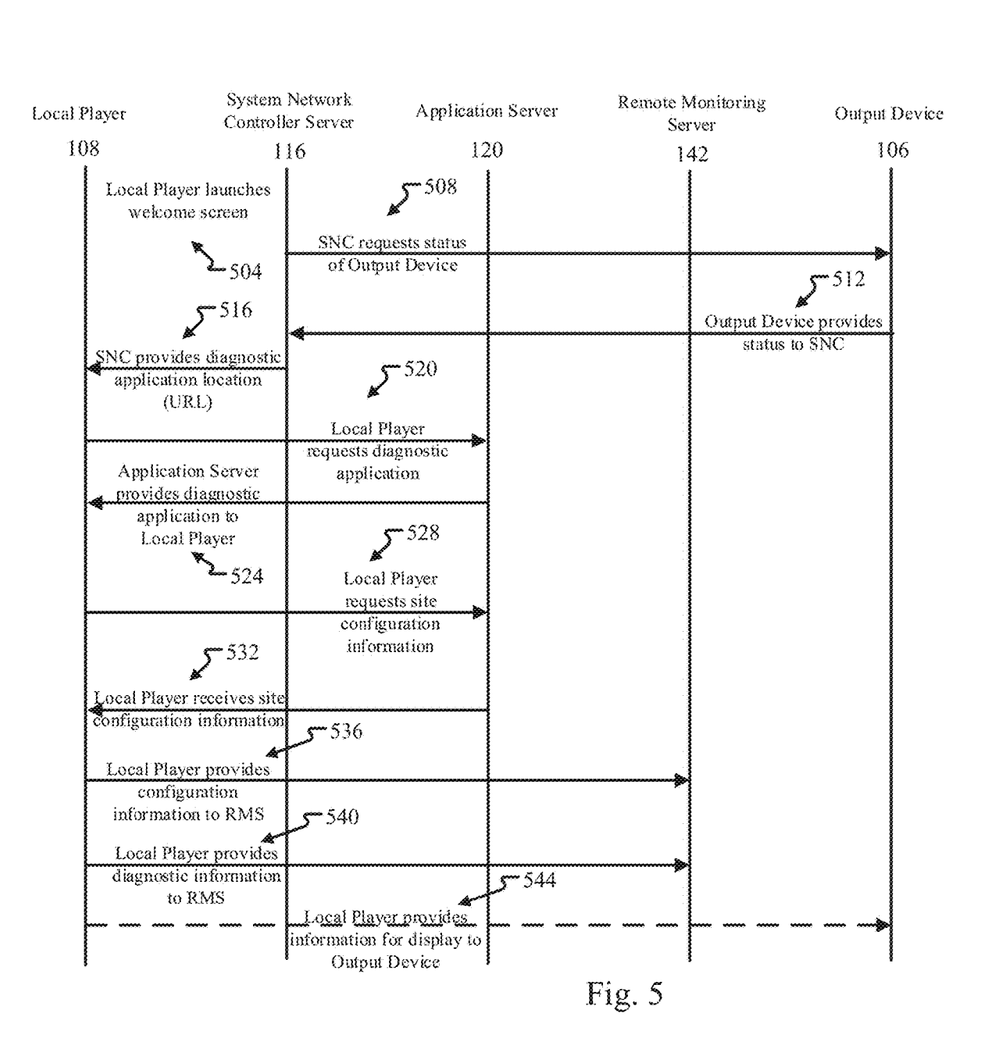
FIG. 5 depicts a third messaging diagram in accordance with embodiments of the present disclosure.

FIG. 5 depicts a messaging diagram utilized by a local player 108 in accordance with embodiments of the present disclosure. That is, a local player 108 may act as a diagnostic device, such as diagnostic device 142, when an output device 106, for example, is not being used by a guest. Accordingly, the local player 108, may initially launch a welcome screen 110 and may display content to the output device 106 that has been provisioned from and/or directed by a guest or user at step 504. When a guest or user leaves the room, such as the guest room 208A, or is no longer using the output device 106 and/or local player 108, the local player 108 may execute the diagnostic application 112. Accordingly, the SNC 116 may periodically request a status of the output device 106 and/or the local player 108 at step 508. For instance, the SNC 116 may determine whether the output device 106 is turned on, what content is being displayed, etc. Alternatively, or in addition, the SNC 116 may be provided with status information of the output device 106 and/or local player 108 from the output device 106 and/or local player 108 itself when a change in state occurs, such as at step 512. For example, if the output device 106 is turned off, the output device 106 may send a message to the SNC 116 informing the SNC 116 that the output device 106 is available to run a diagnostic application 112. Accordingly, the SNC 116 may provide the local player 108 a location of a diagnostic application 112, such as a URL at step 516; the local player 108 may then request the diagnostic application 112 from an application server 120 for example at step 520. Alternatively, or in addition, the diagnostic application may be retrieved from the SNC 116 or other location. The diagnostic app 112 may be provided to the local player 108 at step 524. The local player 108 may also receive site-specific site configuration information at step 532 in response to requesting such information from the application server 120 and/or SNC 116 at step 528. Such information may be provided by the application server 120, SNC 116, or another location capable of providing such information and may include information such as, but not limited to, the name of the device, site location, update frequency, and whether such device is to be a permanent or temporary device. The local player 108 may then provide diagnostic device configuration information to a remote monitoring server 136 at step 536 for example. Further, the local player 108 may then provide diagnostic device diagnostic information to a remote monitoring server 136 including one or more user devices at step 540. Such information may include network scan information, throughput information, network device information, route configuration and utilization information, ping information, delay and jitter information, connection information, and/or other diagnostic information as needed. Moreover, such information may be displayed to an output device 106 if connected, at step 544. In some instances, the local player 108 and/or the SNC 116 may maintain state information such that when the output device 106 is turned back on, the output device 106 resumes displaying the same or similar content as it did prior to being turned off.

Figure 6:
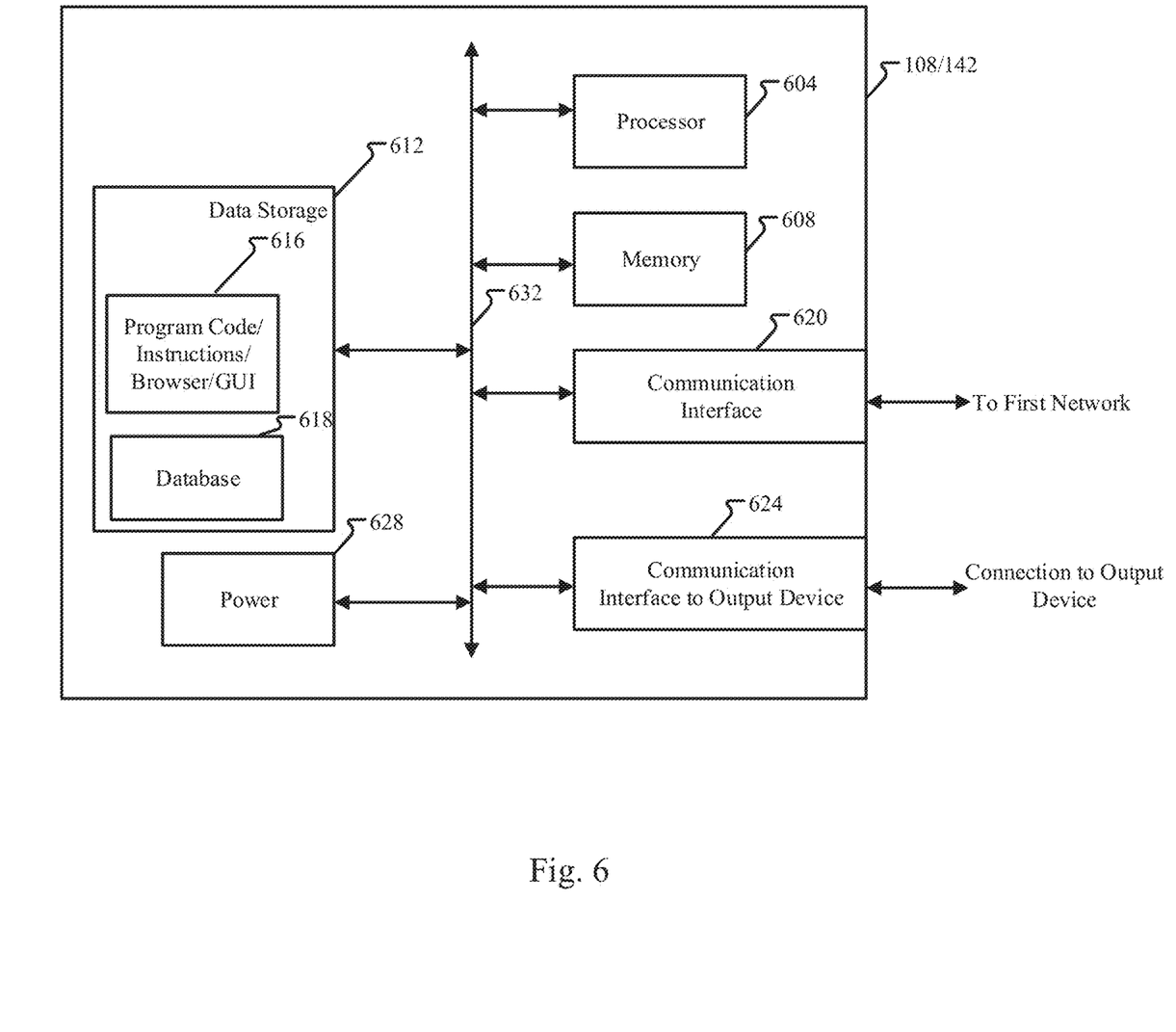
FIG. 6 depicts aspects of a diagnostic device and/or local player, in accordance with embodiments of the present disclosure.

FIG. 6 is a block diagram illustrating components of the local player 108 and/or diagnostic device 142 in accordance with embodiments of the present disclosure. The local player 108 and/or diagnostic device 142 may include a processor 604 and memory 608. The processor 604 may comprise a general purpose programmable processor or controller for executing application programming or instructions. As a further example, the processor 604 may comprise a specially configured application specific integrated circuit (ASIC). The processor 604 generally functions to run programming code or instructions, such as applications or programs, implementing various functions of the local player 108 and/or diagnostic device 142. The memory 608 is generally used in connection with the execution of application programming by the processor 604 and for the temporary or long-term storage of program instructions and/or data. As examples, the memory 608 may comprise removable secure digital storage, RAM, SDRAM, or other solid-state memory.

The local player 108 and/or diagnostic device 142 may also include data storage 612. In accordance with embodiments of the present invention, data storage 612 can contain program code or instructions implementing various applications or functions executed by the local player 108 and/or diagnostic device 142. Like the memory 608, the data storage 612 can comprise a solid-state memory device. In addition, in certain applications, the data storage 612 can be integrated with and/or indistinguishable from the memory 608. Alternatively, or in addition, the data storage 612 may comprise a hard disk drive or other random-access memory and/or can be interconnected to the local player 108 and/or diagnostic device 142, for example as network-attached storage. Programming or modules 616 and 618 stored in the data storage 612 and executed by the processor 604 can include, as examples and without limitation, one or more of program code, instructions, browser, and/or graphical user interfaces for the application diagnostic app 112. The program code/instructions 616 may be the same as or similar to the diagnostic app 112 as previously discussed. That is, program code and/or instructions for the diagnostic app 112 may be located at the data storage area 612. The data storage area may also include a location for storing diagnostic information, such as the database 618. The local player 108 and/or diagnostic device 142 may include one or more communication interfaces, such as communication interfaces 620 and 624, where the communication interface 620 may connect to a first communication network, such as communication network segment 138 and/or communication network segment 140, while the communication interface 624 may provide a connection to the output device 106 utilizing HDMI or other audio/video interface, connecting the local player 108 and/or the diagnostic device 142 to the output device 106. One or more components of the local player 108 and/or diagnostic device 142 may be coupled to one another via the bus 632 and/or powered by the power source 628.

Figure 7:
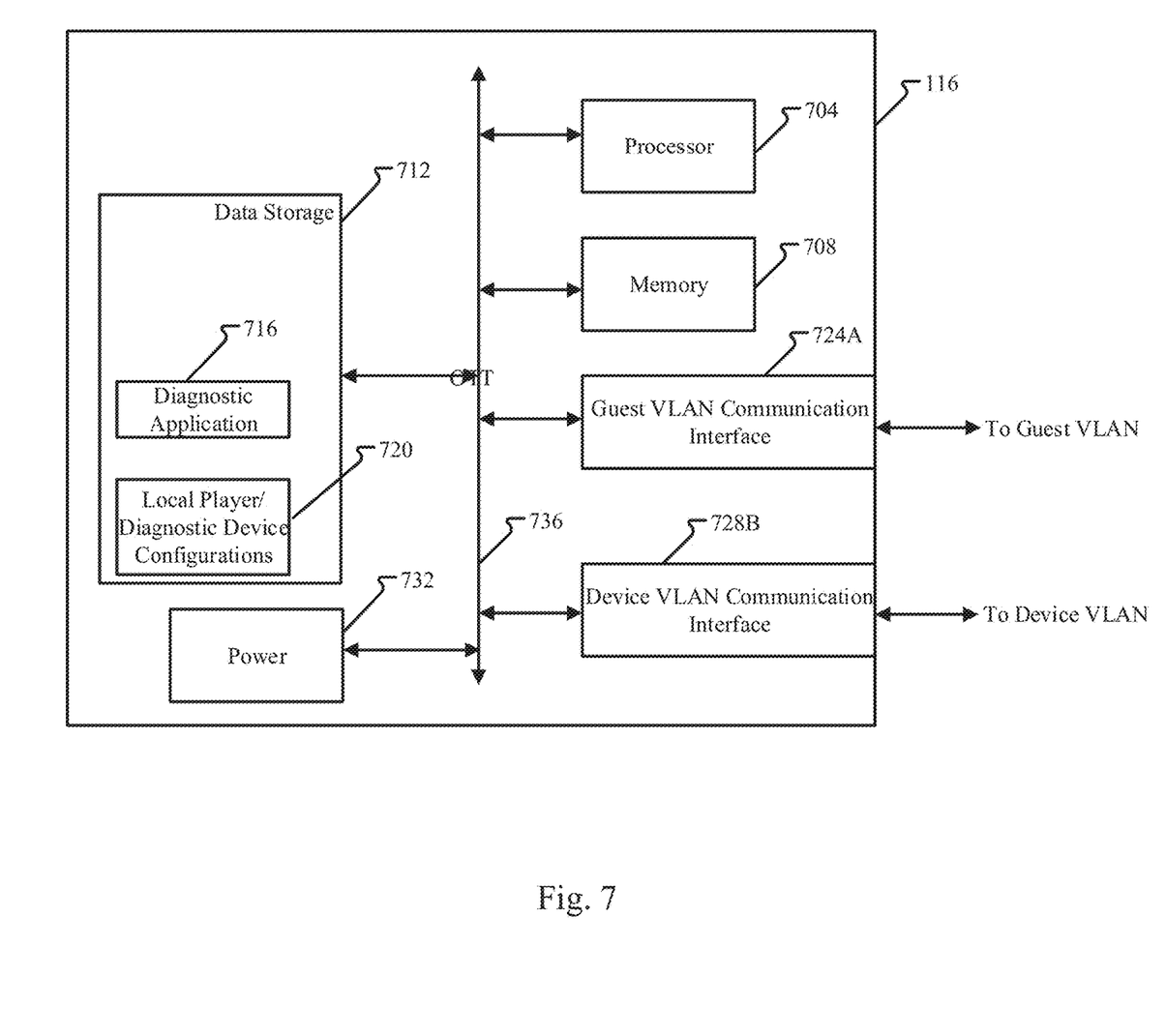
FIG. 7 depicts aspects of a System Network Controller (SNC), in accordance with embodiments of the present disclosure.

FIG. 7 is a block diagram illustrating components of a system network controller (SNC) 116 in accordance with embodiments of the present disclosure. In general, the SNC 116 includes a processor 704 and memory 708. The processor 704 may comprise a general purpose programmable processor or controller for executing application programming or instructions. As a further example, the processor 704 may comprise a specially configured application specific integrated circuit (ASIC). The processor 704 generally functions to run programming code or instructions, such as applications or programs, implementing various functions of the SNC 116. The memory 708 is generally used in connection with the execution of application programming by the processor 704 and for the temporary or long-term storage of program instructions and/or data. As examples, the memory 708 may comprise removable secure digital storage, RAM, SDRAM, or other solid-state memory.

The SNC 116 can also include data storage 712. In accordance with embodiments of the present invention, data storage 712 can contain program code or instructions implementing various applications or functions executed by the SNC server 116. Like the memory 708, the data storage 712 can comprise a solid-state memory device. In addition, in certain applications, the data storage 712 can be integrated with and/or indistinguishable from the memory 708. Alternatively, or in addition, the data storage 712 may comprise a hard disk drive or other random-access memory and/or can be interconnected to the SNC server 116, for example as network-attached storage. Programming or modules 716 and 720 stored in the data storage 712 and executed by the processor 704 can include, as examples and without limitation, one or more diagnostic application 716 and/or one or more local player configurations 720. The one or more diagnostic applications 716 may be the same as or similar to the diagnostic app 112 as previously discussed. That is, the diagnostic app 112 may reside at the SNC 116 such that a local player 108 and/or diagnostic device 142 may retrieve or otherwise execute such diagnostic app 112. The data storage 712 may also include a local player/diagnostic device configuration 720 location. The local player/diagnostic device configuration 720 may include a plurality of configurations, where one or more of the plurality of configurations are specific to the local player 108 and/or diagnostic device 142 requesting a device configuration. For example, a table, or other data association structure, may include identifying information which uniquely identifies the local player 108 and/or the diagnostic device 142 with respect to the hospitality environment 102 or otherwise.

The SNC server 116 may also include one or more communication interfaces 724A-B. For example, a first communication interface 724A may provide a connection to a communication network for use with guest devices, while a second communication interface 728B may provide a connection to a device virtual local area network (VLAN), such as one or more VLANs in which the local player 108 and/or diagnostic device 142 resides. One or more components of the SNC 116 may be coupled to one another via the bus 736 and/or powered by the power source 732.

Figure 8:
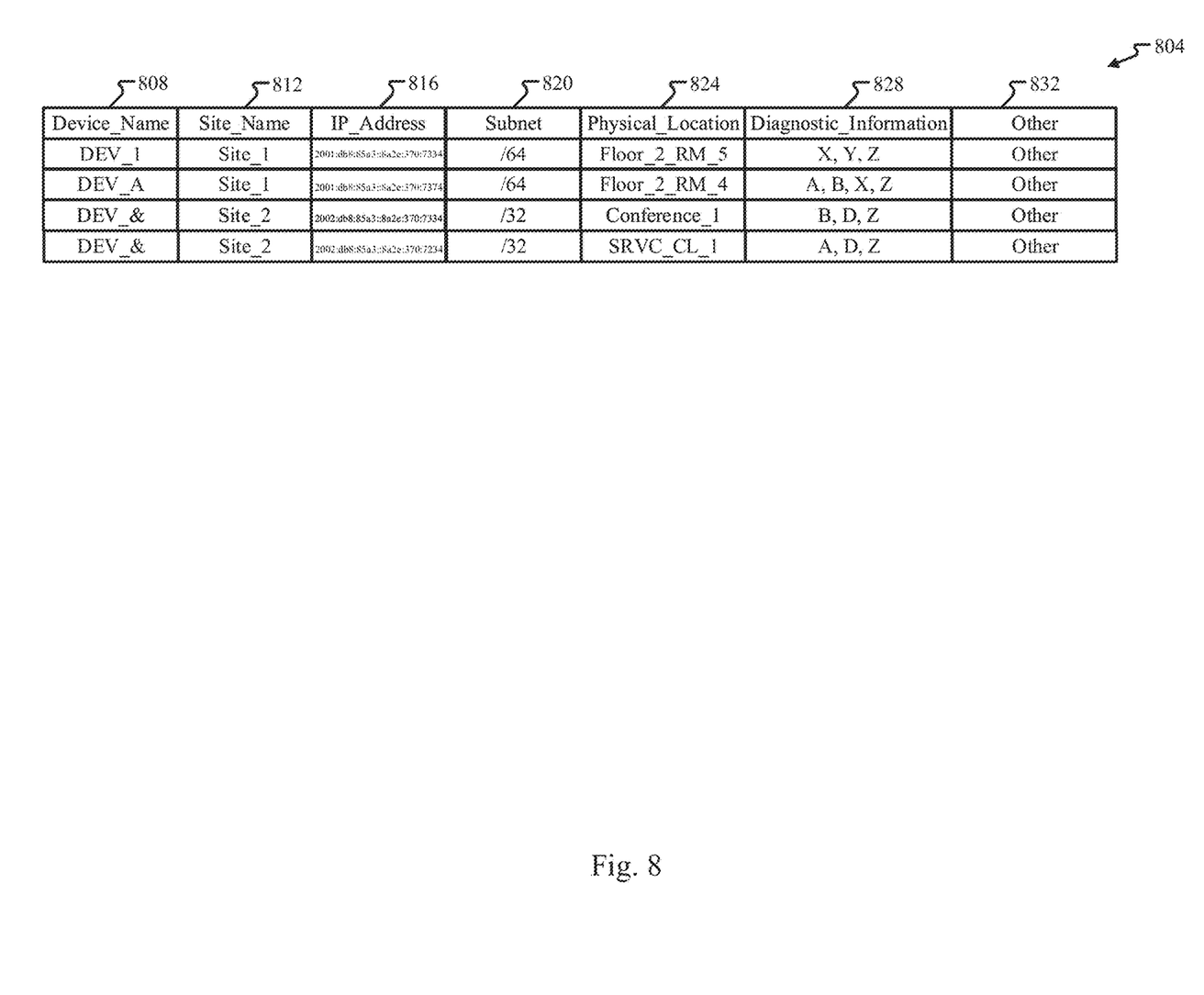
FIG. 8 depicts a data structure, in accordance with embodiments of the present disclosure.

FIG. 8 depicts an example data structure 804 in accordance with embodiments of the present disclosure. One or more portions of the data structure 804, may reside at one or more of the following non-limiting locations: the local player 108, the system network controller 116, and/or the remote monitoring server 136. The data structure 804 may include a device name 808 corresponding to a name of the local player 108 and/or diagnostic device 142, a site name 812 corresponding to the hospitality environment 102, identifying information 816 and 820 such as an internet protocol (IP) address and/or subnet of the local player 108 and/or diagnostic device 142, a physical location 824 of the local player 108 and/or diagnostic device 142 corresponding to a building, floor, and/or room of an hospitality environment 102, and diagnostic information 828. As previously indicated, the diagnostic information 828 may include, but is not limited to, network scan information, throughput information, network device information, route configuration and utilization information, ping information, delay and jitter information, connection information, and/or other diagnostic information as needed. The data structure 804 may also include other or additional information 832 for storing information associated with the local player 108 and/or diagnostic device 142, such whether the device is a permanent device or a transient device.

Figure 9:
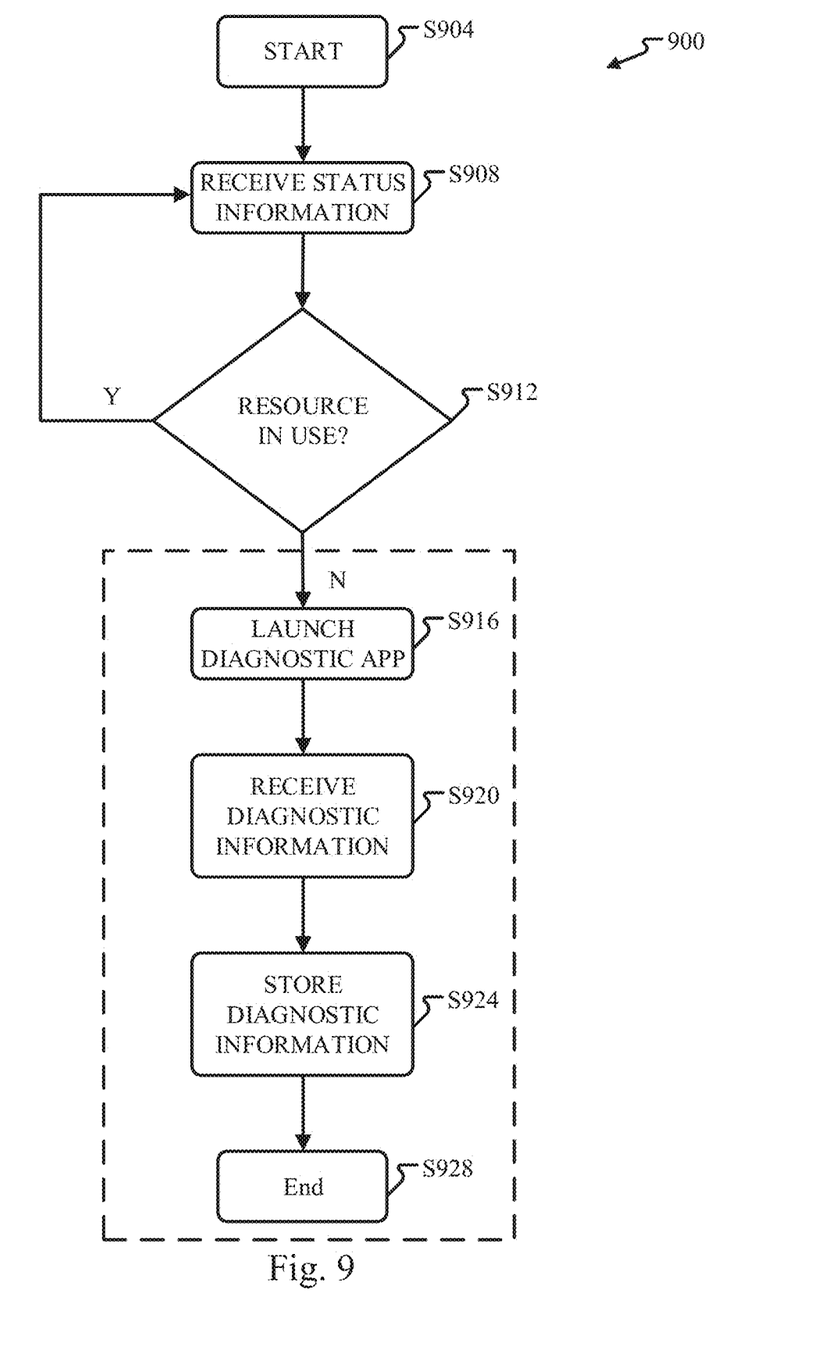
FIG. 9 depicts a first flow diagram of a method for obtaining diagnostic information in accordance with embodiments of the present disclosure.

FIG. 9 depicts a flow diagram of a method 900 for obtaining diagnostic information in accordance with embodiments of the present disclosure. The method 900 is in embodiments, performed by one or more devices, such as the one or more devices included in the system 100. More specifically, one or more hardware and software components included in the local player 108, diagnostic device 142, output device 106, and/or system network controller 116 may be involved in performing the method 900. In one embodiment, one or more of the previously described modules and/or devices perform one or more of the steps of method 900. The method 900 may be executed as a set of computer-executable instructions, executed by a one or more processors of the local player 108, diagnostic device 142, and/or system network controller 116, encoded or stored on a computer-readable medium. Hereinafter, the method 900 shall be explained with reference to systems, components, modules, software, etc. described with FIGS. 1-8.

Method 900 may continuously flow in a loop, flow according to a timed event, or flow according to a change in an operating or status parameter. Method 900 is initiated at step S904 where a request for status information may be sent from the system network controller 116. More specifically, the system network controller 116 may request status information of one or more of the local player 108, diagnostic device 142, and/or output device 106. At step S908, the status information may be received. As previously discussed, the status information may be received at the system network controller 116 and/or local player 108/diagnostic device 142. If, at step S912, the local player 108 and/or the output device 106 is in use, the method may proceed back to step S908. If, however, the local player 108/diagnostic device 142 and/or output device 106 are not in use, the method may proceed to step S916 where the diagnostic app 112 may be launched. At step S920, the local player 108 and/or diagnostic device 142 may receive diagnostic information as previously discussed. At step S924, the diagnostic information may be stored. For example, the local player 108/diagnostic device 142 may store the diagnostic information in a database 618 and later send the diagnostic information to the remote monitoring server 136. The remote monitoring server 136 may then store the diagnostic information. As depicted in FIG. 9, steps S916, S920, S924, and S928 may be performed by the diagnostic device 142 without performing steps S908 and steps S912. The method 900 may end at step S928.

Figure 10:
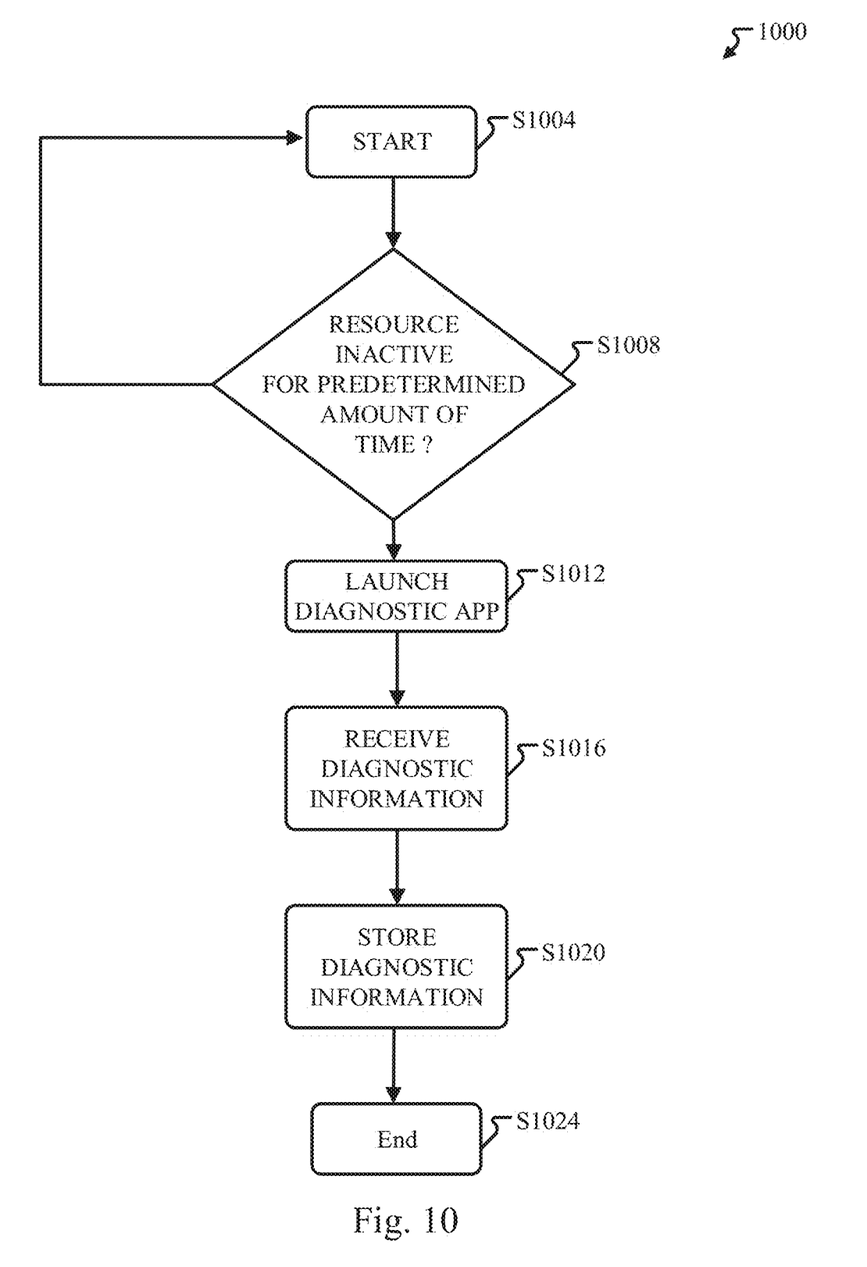
FIG. 10 depicts a second flow diagram of a method for obtaining diagnostic information in accordance with embodiments of the present disclosure.

FIG. 10 depicts a flow diagram of a method 1000 for obtaining diagnostic information in accordance with embodiments of the present disclosure. The method 1000 is in embodiments, performed by one or more devices, such as the one or more devices included in the system 100. More specifically, one or more hardware and software components included in the local player 108 and/or output device 106, and/or system network controller 116 may be involved in performing the method 1000. In one embodiment, one or more of the previously described modules and/or devices perform one or more of the steps of method 1000. The method 1000 may be executed as a set of computer-executable instructions, executed by one or more processors of the local player 108 and/or the system network controller 116, encoded or stored on a computer-readable medium. Hereinafter, the method 1000 shall be explained with reference to systems, components, modules, software, etc. described with FIGS. 1-9.

Method 1000 may continuously flow in a loop, flow according to a timed event, or flow according to a change in an operating or status parameter. Method 1000 is initiated at step S1004 where at step S1008, it is determined whether a resource, such as the local player 108 and/or output device 106, has been inactive or idle for a predetermined amount of time. If the local player 108 and/or output device 106 are in use or have not been inactive for an amount of time greater than a threshold, the method 1000 may return to step S1004. Such predetermined threshold may be any value between one second and 24 hours. For example, the predetermined threshold may be thirty seconds, one minute, two minutes, five minutes, ten minutes, fifteen minutes, thirty minutes, or one hour. If the output device 106 and/or local player 108 has been inactive for an amount of time greater than the threshold, the method 1000 may proceed to step S1012 where the diagnostic app 112 may be launched for example. At step S1016, the local player 108 may receive diagnostic information as previously discussed. At step S1020, the diagnostic information may be stored. For example, the local player 108 may store the diagnostic information in a database 618 and later send the diagnostic information to the remote monitoring server 136. The remote monitoring server 136 may then store the diagnostic information. The method 1000 may end at step S1024.

The present invention has been described with some degree of particularity directed to the exemplary embodiments of the present invention. It should be appreciated though that modifications or changes may be made to the exemplary embodiments of the present invention without departing from the inventive concepts contained herein.

The invention claimed is:

1. A method for obtaining network diagnostic information within a hospitality environment, the method comprising:
   sending, in response to a trigger, a message regarding a status of a diagnostic device, the status indicating an availability of the diagnostic device to run a diagnostic application;
   determining to run the diagnostic application when the message indicates that the diagnostic device is available;
   receiving, in response to the determination to run the diagnostic application, application identification information at the diagnostic device;
   retrieving the diagnostic application based on the application identification information;
   obtaining site configuration information, the site configuration information including information to identify whether the diagnostic device is registered as a permanent diagnostic device that remains in a single location or as a transient diagnostic device that is authorized to change locations;
   configuring the diagnostic application with the site configuration information;
   obtaining the network diagnostic information; and
   providing the network diagnostic information to a remote monitoring server.

2. The method of claim 1, wherein the diagnostic device is a local player device communicatively coupled to an output device, wherein the application identification information is received from a system network controller that is local to the hospitality environment and different from the remote monitoring server.

3. The method of claim 2, further comprising:
   executing, at startup, a default application at the local player device.

4. The method of claim 3, wherein the trigger is the local player device being inactive for a specified period of time.

5. The method of claim 1, further comprising:
   determining whether the diagnostic device has communicated with the remote monitoring server within a specified period of time; and
   providing a communication to an entity if the diagnostic device has not communicated with the remote monitoring server within the specified period of time.

6. The method of claim 1, wherein a frequency at which the diagnostic device provides the network diagnostic information to the remote monitoring server is based on the site configuration information, and wherein the application identification information includes a Uniform Resource Locator (URL).

7. The method of claim 1, wherein the diagnostic device is a local player device communicatively coupled to an output device, and wherein the trigger is a user of the output device exiting a location where the output device is located.

8. A communication system, comprising:
   a first server;
   a remote monitoring server;
   a local player, wherein the local player is in communication with the first server; and
   an output device coupled to the local player,
   wherein,
      the local player provides a status message to the first server in response to a trigger, the status message indicating an availability of the local player to run a diagnostic application,
      the first server determines to launch the diagnostic application when the status message indicates that the local player is available,
      the local player receives, in response to the determination to launch the diagnostic application, application identification information from the first server, the application identification information identifying the diagnostic application to launch,
      the local player retrieves site configuration information, the site configuration information including information to identify whether the local player is registered as a permanent local player that remains in a single location or as a transient local player that is authorized to change locations,
      the local player obtains network diagnostic information, and
      the local player provides the network diagnostic information to the remote monitoring server.

9. The communication system of claim 8, wherein the local player executes a default application at startup.

10. The communication system of claim 9, wherein the status message indicates an amount of time that the local player has been inactive.

11. The communication system of claim 8, wherein the trigger is a request from the first server, and wherein the status message indicates an amount of time that the local player has been inactive.

12. The communication system of claim 8, wherein the remote monitoring server determines whether the local player has communicated with the remote monitoring server within a specified period of time, and if the local player has not communicated with the remote monitoring server within the specified period of time, the remote monitoring server provides a notification to a receiving entity.

13. The communication system of claim 8, wherein a frequency at which the local player provides the network diagnostic information to the remote monitoring server is based on the site configuration information.

14. A non-transitory computer-readable storage media comprising executable instructions, which when executed by one or more processors, cause the one or more processors to:
   send, in response to a trigger, a message regarding a status of a diagnostic device, the status indicating an availability of the diagnostic device to run a diagnostic application;
   receive, in response to a determination that the message indicates the diagnostic device is available to run the diagnostic application, application identification information at the diagnostic device;
retrieve the diagnostic application based on the application identification information;
obtain site configuration information, the site configuration information including information to identify whether the diagnostic device is registered as a permanent diagnostic device that remains in a single location or as a transient diagnostic device that is authorized to change locations;
configure the diagnostic application with the site configuration information;
obtain network diagnostic information; and
provide the network diagnostic information to a remote monitoring server.

15. The non-transitory computer-readable storage media of claim 14, wherein the diagnostic device is a local player device communicatively coupled to an output device.

16. The non-transitory computer-readable storage media of claim 15, wherein the executable instructions cause the one or more processors to:
execute, at startup, a default application at the local player device.

17. The non-transitory computer-readable storage media of claim 16, wherein the trigger is the local player device being inactive for a specified period of time.

18. The non-transitory computer-readable storage media of claim 14, wherein the executable instructions cause the one or more processors to:
determine whether the diagnostic device has communicated with the remote monitoring server within a specified period of time; and
provide a communication to an entity if the diagnostic device has not communicated with the remote monitoring server within the specified period of time.

19. The non-transitory computer-readable storage media of claim 14, wherein a frequency at which the diagnostic device provides the network diagnostic information to the remote server is based on the site configuration information.

20. The non-transitory computer-readable storage media of claim 14, wherein the diagnostic device is a local player device communicatively coupled to an output device, and wherein the trigger is the output device being turned off.

* * * * *